(12) United States Patent
Moore

(10) Patent No.: US 7,192,006 B1
(45) Date of Patent: Mar. 20, 2007

(54) BELT INSPECTION TOOL

(75) Inventor: James Moore, Las Vegas, NV (US)

(73) Assignee: JS Products, Inc., Las Vegas, NV (US)

( * ) Notice: Subject to any disclaimer, the term of this patent is extended or adjusted under 35 U.S.C. 154(b) by 0 days.

(21) Appl. No.: 11/293,704

(22) Filed: Dec. 2, 2005

(51) Int. Cl.
*B66F 3/00* (2006.01)

(52) U.S. Cl. .................................. 254/131

(58) Field of Classification Search ............ 254/131, 254/1, 6, 12, 7; 362/119; 81/355, 357
See application file for complete search history.

(56) References Cited

U.S. PATENT DOCUMENTS

| | | | |
|---|---|---|---|
| 3,138,963 A | 6/1964 | Prince | |
| 4,283,757 A * | 8/1981 | Nalbandian et al. | 362/120 |
| 4,348,715 A | 9/1982 | Christensen et al. | 362/109 |
| 4,380,326 A | 4/1983 | Marzorati et al. | 254/131 |
| 5,265,661 A * | 11/1993 | Tran | 254/131 |
| 5,351,413 A | 10/1994 | Bruner et al. | 33/611 |
| 5,653,654 A | 8/1997 | Davis | 474/119 |
| 6,099,138 A | 8/2000 | Cardan | 362/109 |
| 6,161,817 A | 12/2000 | Lee | 254/131 |
| 6,692,391 B2 | 2/2004 | Gerring et al. | 474/130 |

* cited by examiner

*Primary Examiner*—Robert C. Watson
(74) *Attorney, Agent, or Firm*—Standley Law Group LLP

(57) ABSTRACT

A tool for inspecting serpentine belts of vehicles includes a main body, an upper tang, a right tang, a left tang, a holder and a handle. The tangs define a window therebetween. The window is adapted to receive a belt to be inspected. The handle may be a flashlight used to illuminate the belt to be inspected. When in use, the window shows a portion of the belt to be inspected. A technician can inspect the portion of the belt shown for cracks and recommend replacing the belt.

17 Claims, 6 Drawing Sheets

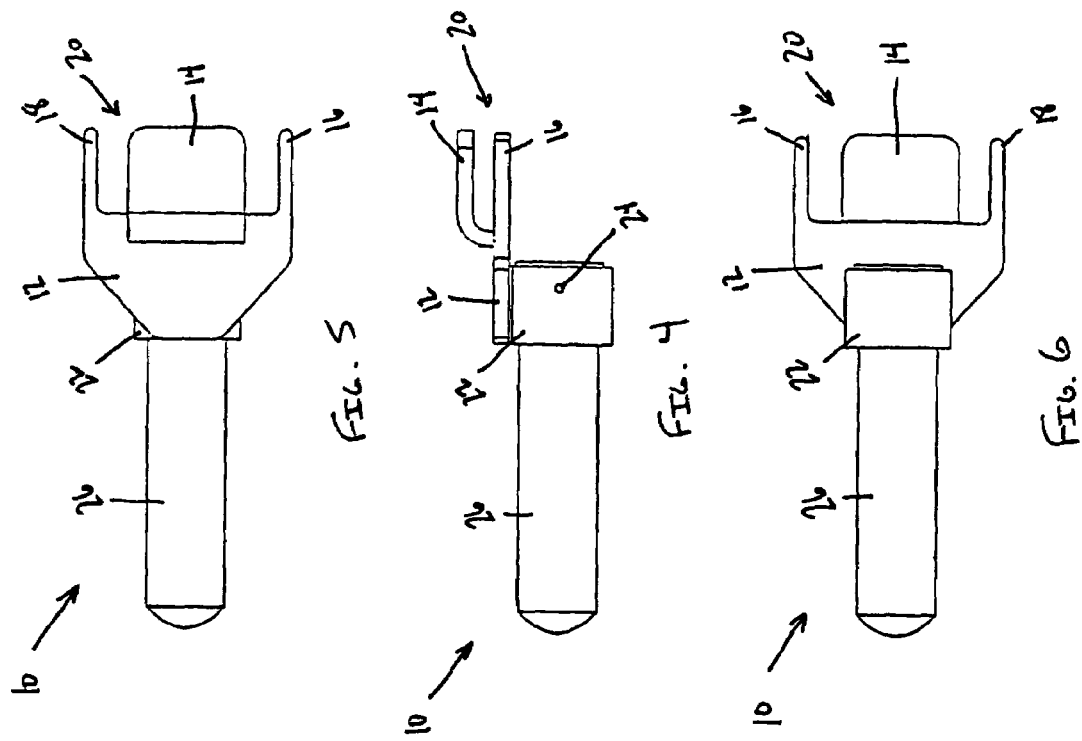

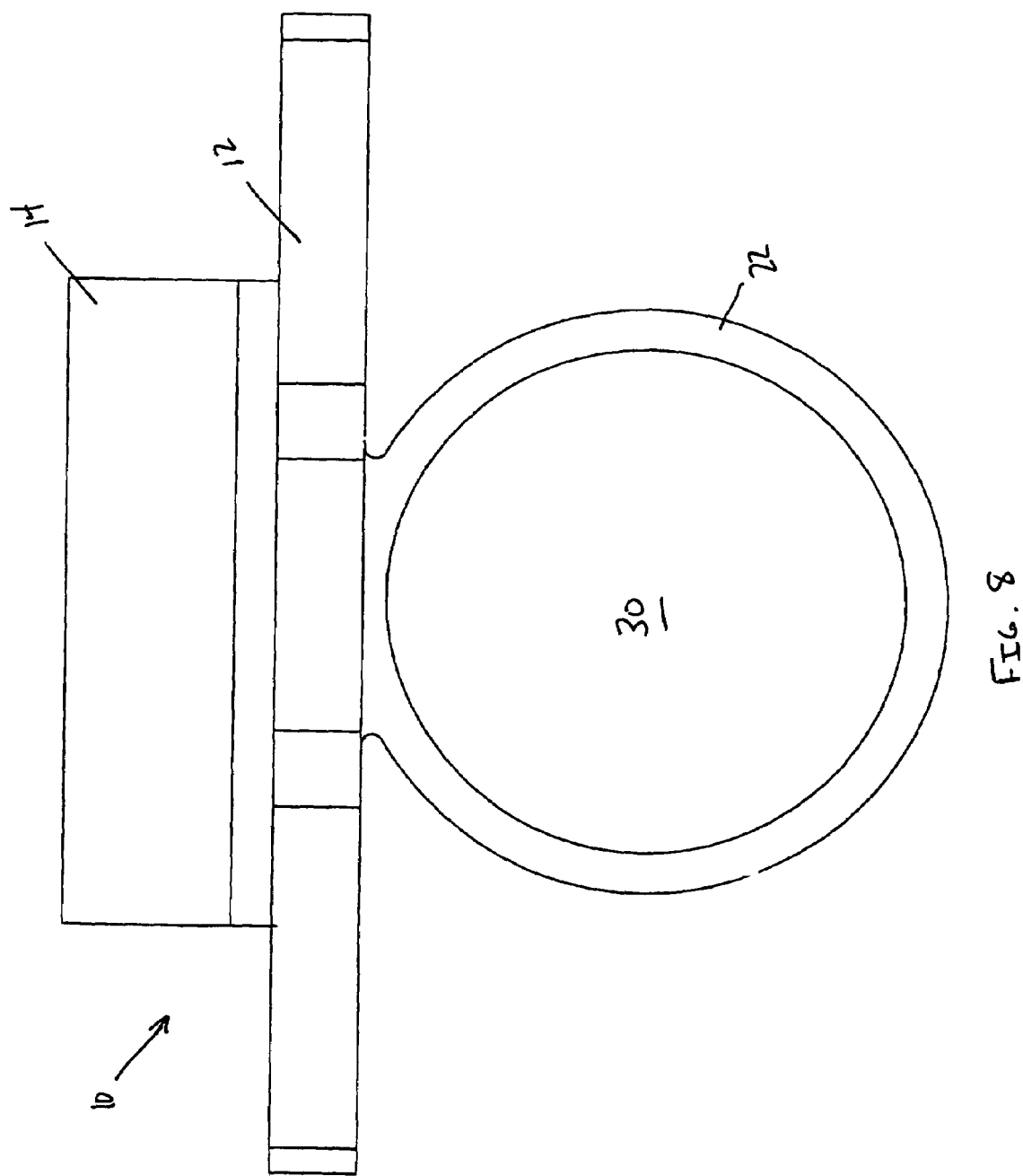

BELT INSPECTION TOOL

BACKGROUND AND SUMMARY OF THE INVENTION

The present invention relates to a tool for inspecting components of vehicles. More particularly, the invention relates to a novel tool for inspecting a vehicle serpentine belt without removing the belt from the engine.

Belts are used in many locations on vehicles. Serpentine belts are used to transfer power from the engine to the alternator. Over the course of use, belts deteriorate and need to be replaced. Current inspection methods are cursory at best. A vehicle maintenance technician can review the belt while the belt is still attached to the vehicle or he may remove the belt completely, which is a cumbersome process with its own expense. If the technician leaves the belt attached, a light is usually needed as the belt is not in an easily accessible location on the vehicle. Because of this location, illuminating the area to be inspected is usually problematic.

Next, the technician looks on the outside of the belt for significant cracks. He also might lift the belt with his fingers to view the underside. If there are more than four significant cracks in one square inch, the belt needs replaced. Currently, the technician will view the belt and "eyeball" whether or not it "looks" as if it needs replaced. Using his own expertise and knowledge, if the belt "looks" deteriorated, he will recommend replacing the belt.

This process is not beneficial to the vehicle owner. Replacement of serpentine belts is expensive. The owner is relying on the technician's "gut feeling" as to whether or not to go through this expense. Each technician has his or her own expertise and one technician may recommend replacement while another may not. Additionally, an owner may just follow the vehicle manufacturer's recommended service limits which will either result in the belt breaking before the suggested replacement mileage or premature replacement of a belt.

Also known are tools for removing belts from vehicles. These belts usually have a hook or similar arrangement that allows the technician to apply leverage to the belt to lift it out of its seat on a pulley within the engine. Once the belt is lifted from the seat it is moved away from the pulley and removed from the engine. These tools can be cumbersome to use for inspections and are usually vehicle specific, meaning certain tools can only be used on certain makes or models of vehicles.

The present invention attempts to solve some or all of these problems. The present invention is a tool for inspecting belts. The tool may include a main body, an upper tang, a right tang, a left tang, a holder and a handle. The upper tang, right tang and left tang define a window therebetween. The window is adapted to receive a belt for inspecting. The handle may be a flashlight and may be attached to the holder by a fastener selected from the group consisting of a screw, a pin, a nail, a rivet, a bolt, a tack, a clasp, a hook, a peg, a cable, a clamp, a clevis, a lug, a ferrule, glue, cement, tape and any combinations thereof.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein:

FIG. 4 is a side elevation view of an exemplary embodiment of the inspection tool.

FIG. 5 is a top plan view of an exemplary embodiment of the inspection tool.

FIG. 6 is a bottom plan view of an exemplary embodiment of the inspection tool.

FIG. 8 is a rear elevation view of an exemplary embodiment of the inspection tool.

DETAILED DESCRIPTION OF THE INVENTION

Figure 1:
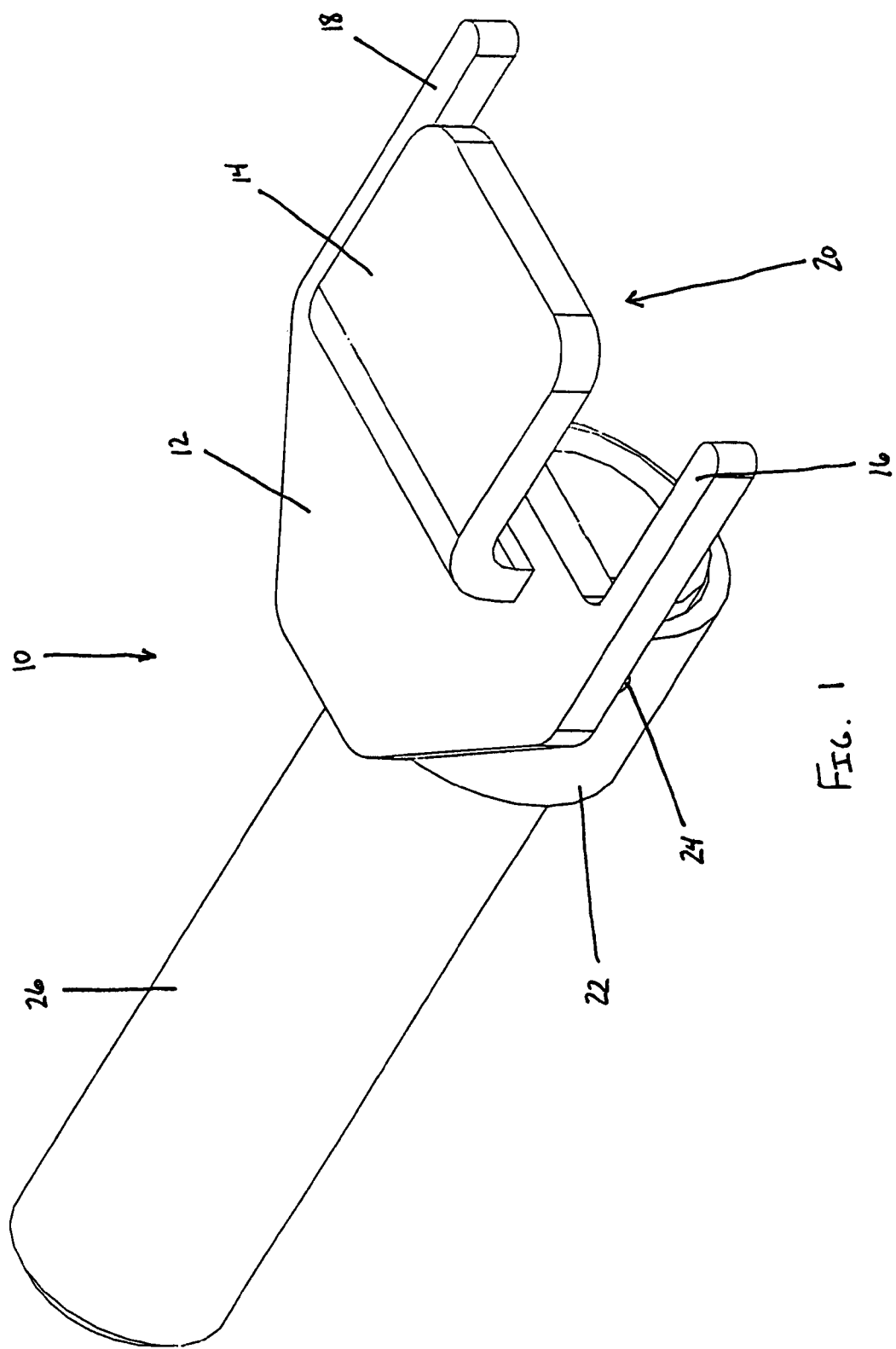
FIG. 1 is a first perspective view of an exemplary embodiment of the inspection tool.
Figure 2:
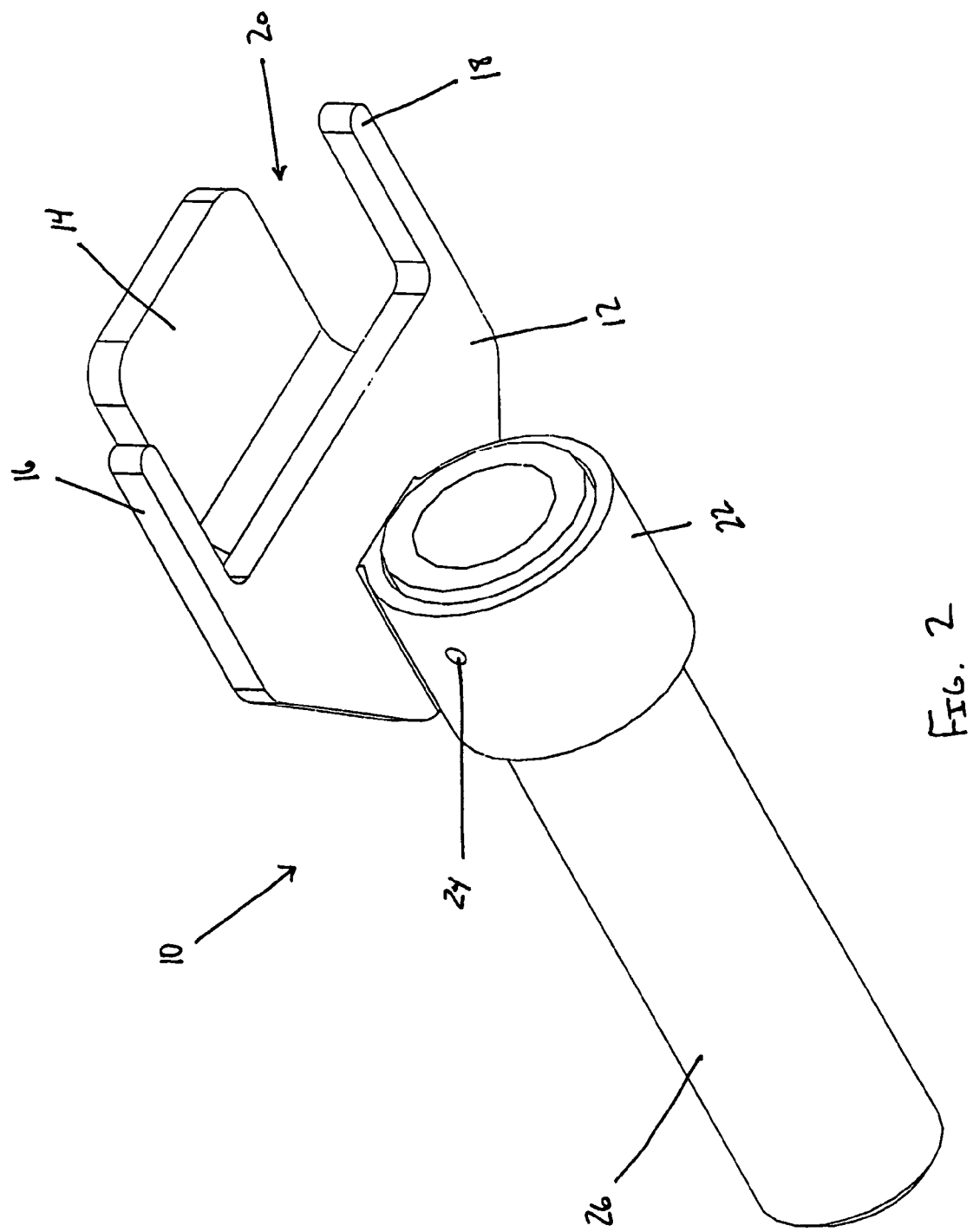
FIG. 2 is a second perspective view of an exemplary embodiment of the inspection tool.
Figure 3:
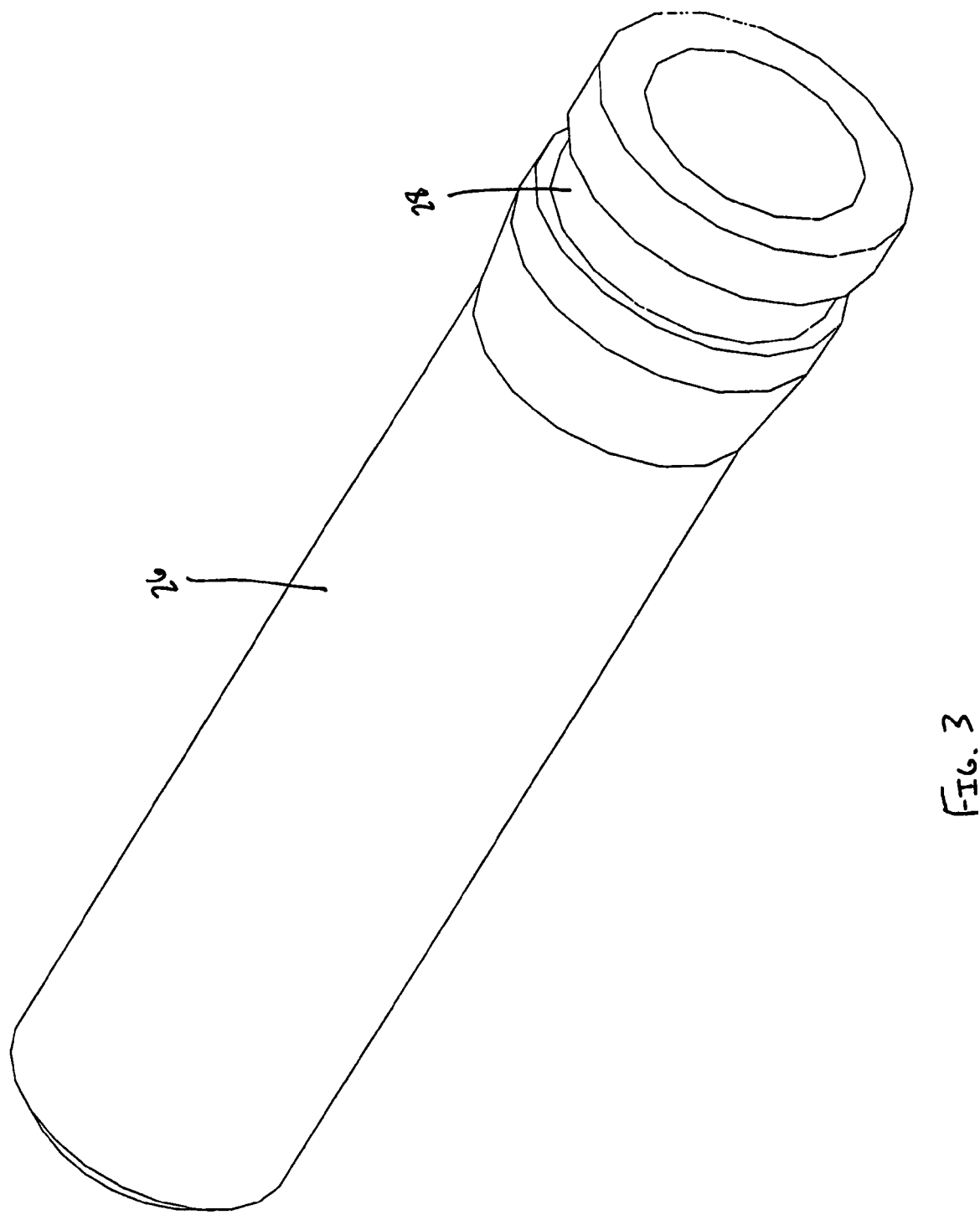
FIG. 3 is a perspective view of an exemplary embodiment of the handle of the inspection tool.
Figure 7:
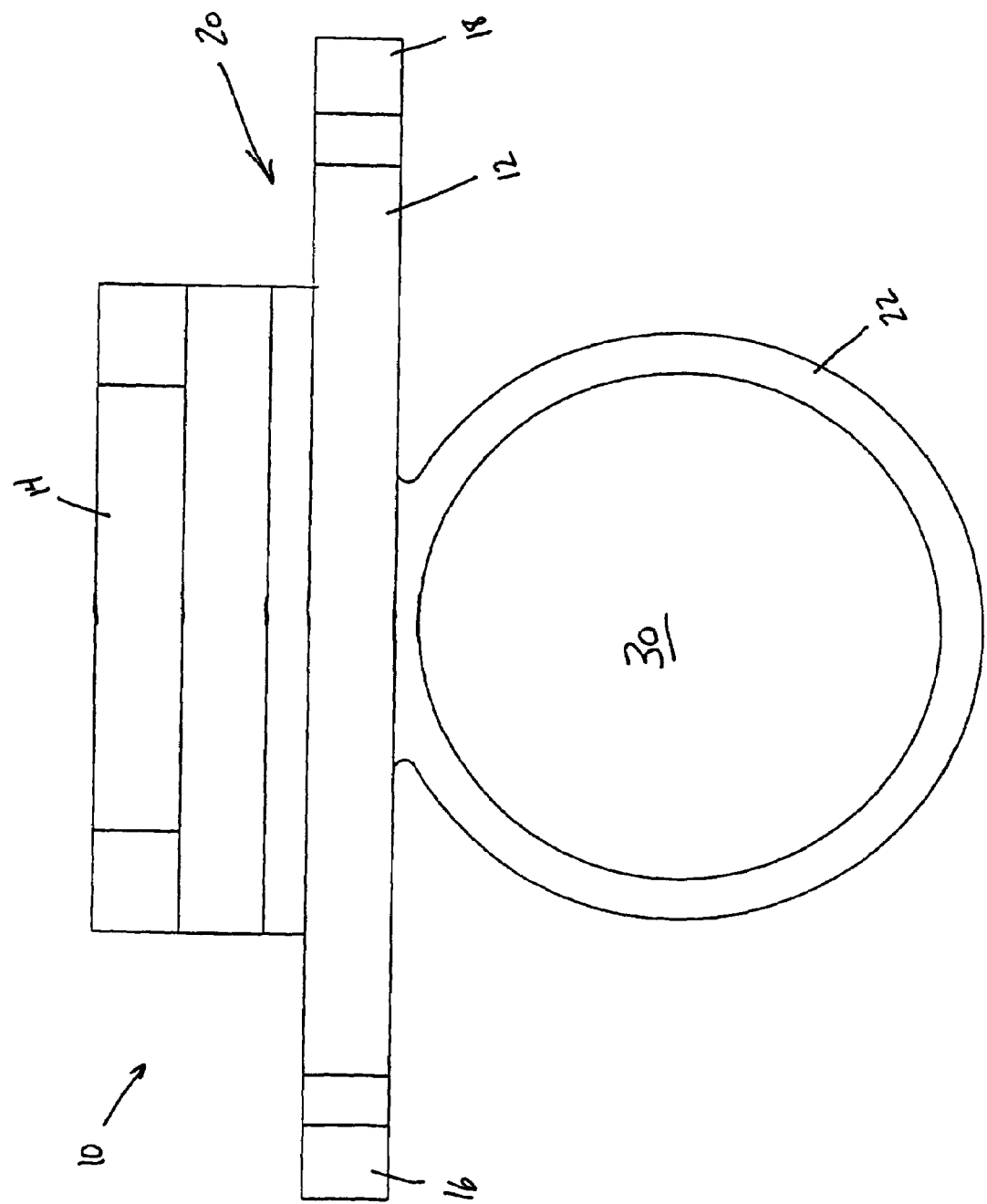
FIG. 7 is a front elevation view of an exemplary embodiment of the inspection tool.

FIG. 1 illustrates an exemplary embodiment of the present invention. A tool 10 for inspecting belts is disclosed. Tool 10 has a main body 12. Associated with main body 12 are an upper tang 14, a right tang 16, a left tang 18, a holder 24 and a handle 26. Upper tang 14 may be centered between and spaced vertically from right tang 16 and left tang 18, which may be co-planar. Main body 12, upper tang 14, right tang 16 and left tang 18 define a window 20. Window 20 is adapted to receive a belt (not shown). Window 20 may be between about 0.75 and 1.5 inches long, between about 0.25 and 1 inches wide and between about 0.05 and 0.3 inches deep. These dimensions are exemplary only and not meant to be limiting. Tool 10 may be sized to fit many different sized belts, as may be known in the art.

As shown in FIGS. 2–8, holder 22 contains two holes. Handle 26 may be inserted into first hole 30. Second hole 24 cooperates with groove 28 on handle 26. A fastener (not shown) passes through second hole 24 and engages groove 28 on handle 26 to secure handle 26 to holder 22. Handle 26 may also be formed integrally with holder 22 or main body 12. In other embodiments, handle 26 may be a flashlight. Any flashlight known in the art may be used for easy replacement should a flashlight break. Fastener (not shown) may be any fastener known in the art, such as: a screw, a pin, a nail, a rivet, a bolt, a tack, a clasp, a hook, a peg, a cable, a clamp, a clevis, a lug, a ferrule, glue, cement, tape and any combination thereof. In other embodiments, main body 12, upper tang, 14, right tang 16, left tang 18, holder 22 and handle 26 may all be formed integrally with each other, each secured together individually or any combination thereof. Also, main body 12, upper tang, 14, right tang 16, left tang 18, holder 22 and handle 26 may be formed of sheet metal, steel, hard plastic, hard rubber, any other known hard material or any combination thereof.

When in use, a technician inserts right and left tangs, 16 and 18 respectively, under a belt to be inspected. The technician pushes down on handle 26 which lifts the belt from its seat and causes the belt to slide between upper tang 14 and right and left tangs, 16 and 18 respectively. The technician twists handle 26, which twists the belt, exposing the underside of the belt. If applicable, the technician may turn on the flashlight by flipping a switch, as is known in the art. The flashlight illuminates the underside of the belt so that the technician may easily inspect the belt for any significant cracks. Window 20 sets out the correct viewing area for the technician to inspect. The technician inspects the exposed and illuminated underside of the belt to see if four or more significant cracks are visible. If four or more cracks are visible, the technician may recommend replacement of the belt, if not the customer will not need to go through the unnecessary expense of replacing a belt.

While certain embodiments of the present invention are described in detail above, the scope of the invention is not to be considered limited by such disclosure, and modifications are possible without departing from the spirit of the invention as evidenced by the following claims:

What is claimed is:

1. A tool for inspecting belts comprising:
   a main body;
   an upper tang, a right tang and a left tang, each associated with said main body, defining a window therebetween, said window being sized to receive and retain a belt to be inspected; and
   a flashlight associated with said main body and positioned to illuminate said window.

2. The tool of claim 1 wherein said flashlight is a handle for said tool.

3. The tool of claim 1 further comprising a holder associated with said main body and adapted to receive said flashlight.

4. The tool of claim 3 wherein said flashlight comprises at least one groove for receiving a fastener to secure said flashlight to said holder.

5. The tool of claim 4 wherein said fastener is selected from the group consisting of a screw, a pin, a nail, a rivet, a bolt, a tack, a clasp, a hook, a peg, a cable, a clamp, a clevis, a lug, a ferrule, glue, cement, tape and any combinations thereof.

6. The tool of claim 1 wherein said right and left tangs are co-planar.

7. The tool of claim 6 wherein said right and left tangs are in a first plane; said upper tang is in a second plane and said first and second planes are parallel.

8. The tool of claim 1 wherein said window is between about 0.75 and 1.5 inches long, between about 0.25 and 1 inches wide and between about 0.05 and 0.3 inches deep.

9. A tool for inspecting belts comprising:
   a main body;
   a left tang and a right tang associated with said main body;
   an upper tang associated with said main body and spaced apart from said left tang and said right tang, defining a window therebetween, said window being sized to receive, retain and manipulate a belt to be inspected;
   a holder associated with said main body and having at least one opening therein; and
   a handle inserted into said at least one opening of said holder and secured thereto;
   wherein said handle is a flashlight that is positioned to illuminate said belt.

10. The tool of claim 9 wherein said handle is secured to said holder with a fastener selected from the group consisting of a screw, a pin, a nail, a rivet, a bolt, a tack, a clasp, a hook, a peg, a cable, a clamp, a clevis, a lug, a ferrule, glue, cement, tape and any combinations thereof.

11. The tool of claim 9 further comprising said holder having a plurality of openings, said handle inserted into a first opening;
    said handle having a groove;
    said groove aligned with a second opening on said holder;
    a fastener inserted into said second opening and engaging said groove to secure said handle to said holder.

12. The tool of claim 11 wherein said fastener is selected from the group consisting of a screw, a pin, a nail, a rivet, a bolt, a tack, a clasp, a hook, a peg, a cable, a clamp, a clevis, a lug, a ferrule, glue, cement, tape and any combinations thereof.

13. The tool of claim 9 wherein said right and left tangs are co-planar.

14. The tool of claim 13 wherein said right and left tangs are in a first plane; said upper tang is in a second plane and said first and second planes are parallel.

15. The tool of claim 9 wherein said window is between about 0.75 and 1.5 inches long, between about 0.25 and 1 inches wide and between about 0.05 and 0.3 inches deep.

16. The tool of claim 9 wherein said main body is integral with said tangs, said holder and said handle.

17. A hand tool for inspecting serpentine belts on automobiles comprising:
    a main body;
    a right tang and a left tang associated with said main body;
    an upper tang associated with said main body and spaced apart from said right tang and said left tang, defining a window therebetween;
    said upper tang centered between and spaced vertically from, said right and left tangs;
    a holder situated below said main body and having at least one opening therein;
    a handle having a groove; said handle inserted into said at least one opening of said holder and secured thereto by a fastener engaging said groove; and
    wherein said handle is a flashlight.

* * * * *